166-250 SR
12/16/86 XR RE 32,304

United States Patent [19]

Maxwell

[11] E Patent Number: Re. 32,304

[45] Reissued Date of Patent: Dec. 16, 1986

[54] CHEMICAL TREATMENT FOR LIQUID SYSTEMS

[76] Inventor: Richard Maxwell, 2021 E. 56th, Odessa, Tex. 79762

[21] Appl. No.: 778,904

[22] Filed: Sep. 23, 1985

Related U.S. Patent Documents

Reissue of:

[64] Patent No.: 4,436,148
Issued: Mar. 13, 1984
Appl. No.: 257,780
Filed: Apr. 27, 1981

[51] Int. Cl.[3] ..... E21B 37/06; E21B 37/08; E21B 43/12; E21B 44/00

[52] U.S. Cl. ..... 166/53; 137/870; 166/64; 166/68; 166/91; 166/250; 166/312; 166/371; 166/902

[58] Field of Search ..... 166/53, 64, 65.1, 68, 166/75.1, 250, 267, 310, 311, 312, 370, 371, 902; 137/605, 606, 870

[56] References Cited

U.S. PATENT DOCUMENTS

| | | | |
|---|---|---|---|
| 1,923,098 | 8/1933 | Knight et al. | 166/75.1 |
| 2,258,615 | 10/1941 | Kendrick | 166/68 |
| 2,773,551 | 12/1956 | Warden et al. | 166/64 |
| 2,884,067 | 4/1959 | Marken | 166/310 X |
| 3,053,320 | 9/1962 | Steincamp | 166/75.1 X |
| 3,071,189 | 1/1963 | Colvin et al. | 166/68 |
| 3,211,225 | 10/1965 | Thiessen et al. | 166/75.1 |
| 3,228,472 | 1/1966 | Rhoads, Jr. | 166/75.1 |
| 3,710,867 | 1/1971 | Bansbach | 166/244.1 |
| 4,064,936 | 12/1977 | McClure | 166/75.1 |
| 4,267,885 | 5/1981 | Sanderford | 166/250 |

*Primary Examiner*—George A. Suchfield
*Attorney, Agent, or Firm*—Robert C. Peterson

[57] ABSTRACT

A gravity system, the only moving parts of which are the valves, uses only the system pressures, and opening and closing of valves to feed treatment liquids to an oil well. The chemical treatment liquid is stored in a drum above a volume chamber. The volume chamber has five lines connected to it, each with a valve. A feed line with a feed valve connects the volume chamber to the treatment drum. A vent line with a vent valve vents the top part of the volume chamber to the atmosphere. A liquid pressure line with a pressure valve connects the flow line (connected to the oil well eduction tube) to the volume chamber. A flush line with a flush valve connects the bottom of the volume chamber to the well annulus. A gas line with a gas valve connects the volume chamber to the annulus. When the vent valve and feed valve are open and all other valves are closed, the volume chamber will fill with liquid by gravity from the chemicals within the treatment drum. Then when the pressure valve and the flush valve are open, the treatment chemicals which have been measured into the volume chamber will be flushed by the produced fluids within the flow line back into the annulus of the oil well. Then opening the flush valve and the gas valve and closing all other valves will purge the volume chamber of all liquid thereby returning it to a condition to be filled again as first described above.

4 Claims, 2 Drawing Figures

CHEMICAL TREATMENT FOR LIQUID SYSTEMS

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to adding treatment liquid to liquid systems and more particularly to adding treatment chemicals such as anti-corrosive material to a liquid system.

(2) Description of the Prior Art

It is well-known that in certain fields of endeavor that it is desirable to add treatment chemicals or liquids into a liquid system. Perhaps the most widely known of such situations is adding chloride or bromide compounds to swimming pools. In industrial applications it is well-known that various treatment chemicals were previously added to boiler make-up water, and at present day, chemicals are added to cooling tower water. However, the most particular and major use of chemical treatment is to treat petroleum products in or from an oil well.

The problems encountered in such a situation are many. The petroleum products which are produced from the reservoir within the earth are often corrosive, and often have problems with the formation of paraffin, as well as other problems. Thus there is a need to add certain treatment liquids to the oil well.

Before this application was filed, a search was made at the United States Patent and Trademark Office. The following Patents were found in this search and appear to be pertinent to this application:

| Names | Numbers | Dates |
|---|---|---|
| BANSBACH | 3,710,867 | Jan. 13, 1971 |
| BUSHNELL | 1,700,996 | Feb. 5, 1929 |
| DONIGUIAN ET AL. | 3,901,313 | Aug. 26, 1975 |
| HARRISON | 4,132,268 | Jan. 2, 1979 |
| KEATON, JR. | 3,242,990 | Mar. 29, 1966 |
| MARKEN | 2,884,067 | Apr. 28, 1959 |
| McCLURE | 4,064,936 | Dec. 27, 1977 |
| RHOADS, JR. | 3,228,472 | Jan. 11, 1966 |
| STEINCAMP | 3,053,320 | Sept. 11, 1962 |
| THIESSEN ET AL. | 3,211,225 | Oct. 12, 1965 |
| WARDEN ET AL. | 2,773,551 | Dec. 11, 1956 |

SUMMARY OF THE INVENTION (1) New and Different Function

I have invented a chemical treatment system that operates without any pumps. The system uses gravity and the fluid pressures already existing in the well to move the treatment chemical. It is necessary to have four or five valves to operate the system. Electric or hydraulic valves, which are extremely reliable, and readily available on the market are used to make a system which is extremely reliable and reasonable in cost. Basically, the system operates around a volume chamber which could be considered a flush chamber or measurement chamber. This chamber, when empty, may be vented to the atmosphere and filled by gravity with liquid chemicals from a drum which is at a higher elevation than the volume chamber. Then the supply or feed valve is closed and the atmosphere vent valve closed. High pressure liquid from the well into the volume chamber is used to flush the treatment chemical into the annulus of the well.

Inasmuch as normally the casing or annulus pressure will be above atmospheric pressure, it is necessary to close the flow line or the pressure valve into the chamber and open a gas valve getting the gas pressure from the annulus to purge the volume chamber. Thus the volume chamber will have the same pressure (the annulus pressure to the top and bottom). Therefore any liquid contents in the volume chamber will drain by gravity from the volume chamber into the annulus. After the volume chamber is purged it is again refilled with treatment chemical from the overhead drum.

The system is adapted for multiple chemical treatment. If it is desired to introduce three separate chemicals into the oil well, then three supply drums are provided, each one with a valve and metering orifice. Opening all three feed valves, will fill the volume chamber with a mixed charge.

A plurality of wells may be treated from a single treatment unit. For example, three wells are designated as wells A, B, and C. The volume chamber is filled with chemicals suitable for treatment of well A. Thereafter the flush valve and flow line valve from well A will flush the chemical into well A. Opening the annulus gas valve from well A will purge the oil remaining in the volume chamber back into well A. Next the volume chamber could be filled with chemical from the three overhead drums suitable for treating well B and therafter the chemicals flushed into well B by opening the flush valve and flow line valve from well B. In similar manner, well C could be treated.

Controls to operate the valves are well-known.

For the operation of the invention, normally it is necessary to have five valves, (1) an atmospheric vent to that the volume chamber may be vented while gravity filling in from the feed tank; (2) a feed tank valve; (3) a flush valve; (4) a flow line valve; and (5) a gas valve from the casing. If the casing pressure is atmospheric pressure, it is not necessary to have the fifth valve. I.e. it is not necessary to have a casing pressure valve, because the volume chamber may be purged by venting to the atmosphere. In such an event, only four valves are necessary.

Thus it may be seen that the total functions of the entire unit is far greater than the sum of the functions of the individual elements such as valves, lines, chambers, drums, etc.

(2) Objects of this Invention

The object of this invention is to chemically treat liquid systems.

More particularly, the object of this invention is to add chemical treatments to oil wells.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, reliable, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
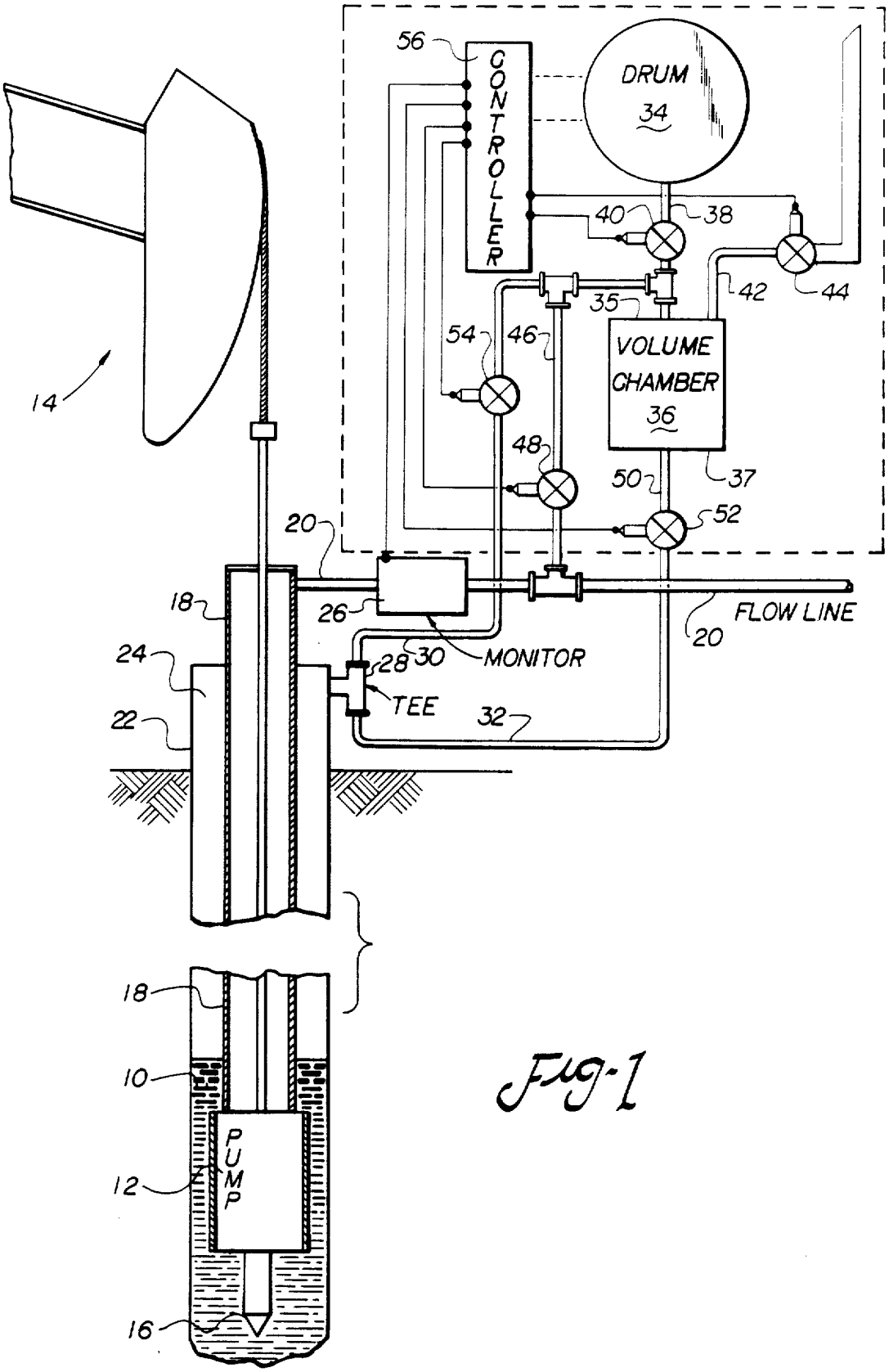
FIG. 1 is a schematic representation showing a first embodiment of a system to add treatment liquid from a single drum to a single oil well.

FIG. 1 of the drawing, represents a liquid system in the form of an oil well. The oil well is shown schematically, having liquid reservoir 10 at the bottom of the well. Pump 12 is operated by a conventional pump jack 14 on the surface of the earth.

The pump 12 will have its pump intake 16 within the reservoir 10. The pump 12 will pump the oil from the reservoir up eduction tube 18 to flow line 20. The eduction tube is within the casing 22. The space between the eduction tube and casing is called annulus 24 and the gas within the annulus is sometimes called casing gas. The liquid oil within the flow line 20 will be pressurized by the pump 12.

Often the pressure of the casing gas will be quite high. For example, it might be as much as 1,000 pounds per square inch. However, even at a 1,000 pounds per square inch, the gas would only lift the oil about 2,000 feet. Even though there were considerable pressure on the reservoir, it would be insufficient to lift the oil to the surface of the earth. Even if the oil were lifted to the surface of the earth, the pressure of the reservoir liquid at the surface of the earth would be far less than the casing gas pressure. I.e., the casing gas forms a source of gas having a gas pressure which is greater than the pressure of the reservoir liquid at the level of the surface of the earth.

Oil wells are often equipped with a monitor or monitoring unit 26 in the flow line 20 adjacent to the eduction tube 18. These monitoring units are known to the oil well art and include devices which form monitoring means for monitoring the fluid in the flow line 20 to determine the need for treatment liquid in the flow line fluids. The monitoring units will have an output in the form of an electrical impulse or electronic signal which can be used in control units.

Also, oil wells are often provided with a gas separator tee 28 attached to the top of the casing 22. This tee has a gas line 30 extending from the top of the separating tee 28 and a fluid line 32 extending from the bottom of the separating tee 28.

Those with ordinary skill in the oil well arts will recognize that the specific embodiment as described to this point is old, conventional, and common to many producing oil wells.

To this system, I connect the treatment unit which is adapted to a self-contained unit mounted on skids or the like for convenient use. The physical unit with the skids has not been illustrated inasmuch as structural connections would be obvious to anyone having ordinary skill in the oil well arts particularly into the chemical treatment of oil wells.

Treatment drum 34 is mounted on a rack or other structural support so that it is at an elevation above flush or volume chamber 36. The volume chamber 36 has top 35 and bottom 37. The treatment drum contains treatment liquid. This treatment liquid could be either anti-corrosive material, paraffin solvents or other treatment desired by the operator to be added to the oil. The various treatments to be added to the oil will vary from one well to another, but the treatment liquids are well within the scope of those having ordinary skill in this art. Treatment feed line 38 connects the drum 34 to the top 35 of the volume chamber 36. Feed valve 40 is within the line. In the preferred embodiment, all valves will be electrically operated either as solenoid valves or electrically rotated valves. Such valves are known within the art and are commercially available on the market.

Vent line 42 extends from the top 35 of the volume chamber 36 upward to an elevation higher than the drum 34. Vent valve 44 is in the vent line. Liquid pressure line 46 extends from the flow line 20 to the top 35 of the volume chamber 36. Pressure valve 48 is in the pressure line 46. Flush line 50 extends from the bottom 37 of the volume chamber 36 to the liquid line 32 of the separating tee 28. Flush valve 52 is within the flush line 50.

Gas line 30 extends from the top of the tee 28 as previously described and connects to the volume chamber 36 preferably near the top 35 thereof. Gas valve 54 is located within the gas line 30.

An operating unit or controller 56 is attached conveniently to the treatment unit. For simplicity of illustration it is shown as attached to the chemical drum, however, as previously stated, it is anticipated that there would be a certain framework mounted on skids to which the treatment drum 34, volume chamber 36, and controller 56, would all be attached. Also, all the valves would be mounted upon the lines within the physical confines of this framework so that all that is necessary, is to connect the three lines, that is to say the pressure line 46, flush line 50, and gas line 30 into the skid unit for ready operation.

Two modes of operation would be available to the operating personnel. If operation were to be strictly on a time basis the unit would be set to perform a chemical treatment at a certain time period. E.g. it would be set to begin an operation every 24 hours, every 12 hours, or every 36 hours, as the particular well necessitated. The sequence of operations would be to close all of the valves to the volume chamber and, assuming that the volume chamber had been purged, then the first step of operating sequence would be to open the vent valve 44 and the feed valve 40. The chemical from the treatment drum 34 would readily flow by gravity through the open feed valve 40 into the volume chamber 36 until it was full. After a period of time necessary to fill the volume chamber, all of the valves to the volume chamber would again be closed. Thereafter, the second step would be to open the flush valve 52 and the pressure valve 48. This would cause the high-pressure fluid in the flow line 20 to flow into the volume chamber and to cause the treatment liquid to flow through the flush line 50 into the liquid line 32 and thus into the annulus 24 of the well. Once the fluid that flowed into the annulus of the well, it would flow down the annulus into the reservoir 10 where it would mix with this reservoir and be pumped to the surface by pump 12 through the eduction tube 18. After sufficient time, so that all of the treatment fluid within the volume chamber had been flowed into the reservoir 10, then again all valves would be closed. Thereafter for the third step, the purging operation, the flush valve 52 would be open and the gas valve 54 open.

Then the gas pressure from the annulus would act as a vent and the fluid within the volume chamber would run by gravity out the flush line into the fluid line 32 and out through the tee 28 into the annulus of the well. Therefore it may be seen that the volume chamber must be located at an elevation above the separation tee 28, which will be above th. surface of the earth.

Should the casing 22 be opened to the atmosphere, which is to say the pressure of the gas within the annulus 24 is no greater than atmospheric pressure, the gas line 30 together with the gas valve 54 could be eliminated for the operation. To purge the volume chamber 36, the flush valve 52 would be open and the vent valve 44 open.

After the purging operation is complete, all valves are again closed and the unit is ready for the next cycle, which begins with the filling of the volume chamber 36 from the treatment drum 34 as above described.

Of course the opening and closing of all the valves is controlled from the controller. Previously, these operating units, or controllers, were referred to as "timers" inasmuch as they had mechanical clocks. Today, it is much preferred to use electronic controllers. These electronic controllers have electronic clocks or timers and also have electronic switching to electrically activate the five valves. All five of the valves, that is to say the feed valve 40, vent valve 44, pressure valve 48, flush valve 52, and gas valve 54 are operated by electrical activation from the controller 56. Those having ordinary skill in electronic controls or operating units can readily design electronic equipment to carry out the functions as described above.

The above operation was described as a time operation. It will be understood that the operation would be almost identical if it were a "demand" operation, i.e., if the activation of the unit were initiated from the monitoring unit 26. In that sequence of events, of course, the controller would be activated by activating means for activating the operating unit responsive to the monitoring means which is the monitoring unit 26.

Figure 2:
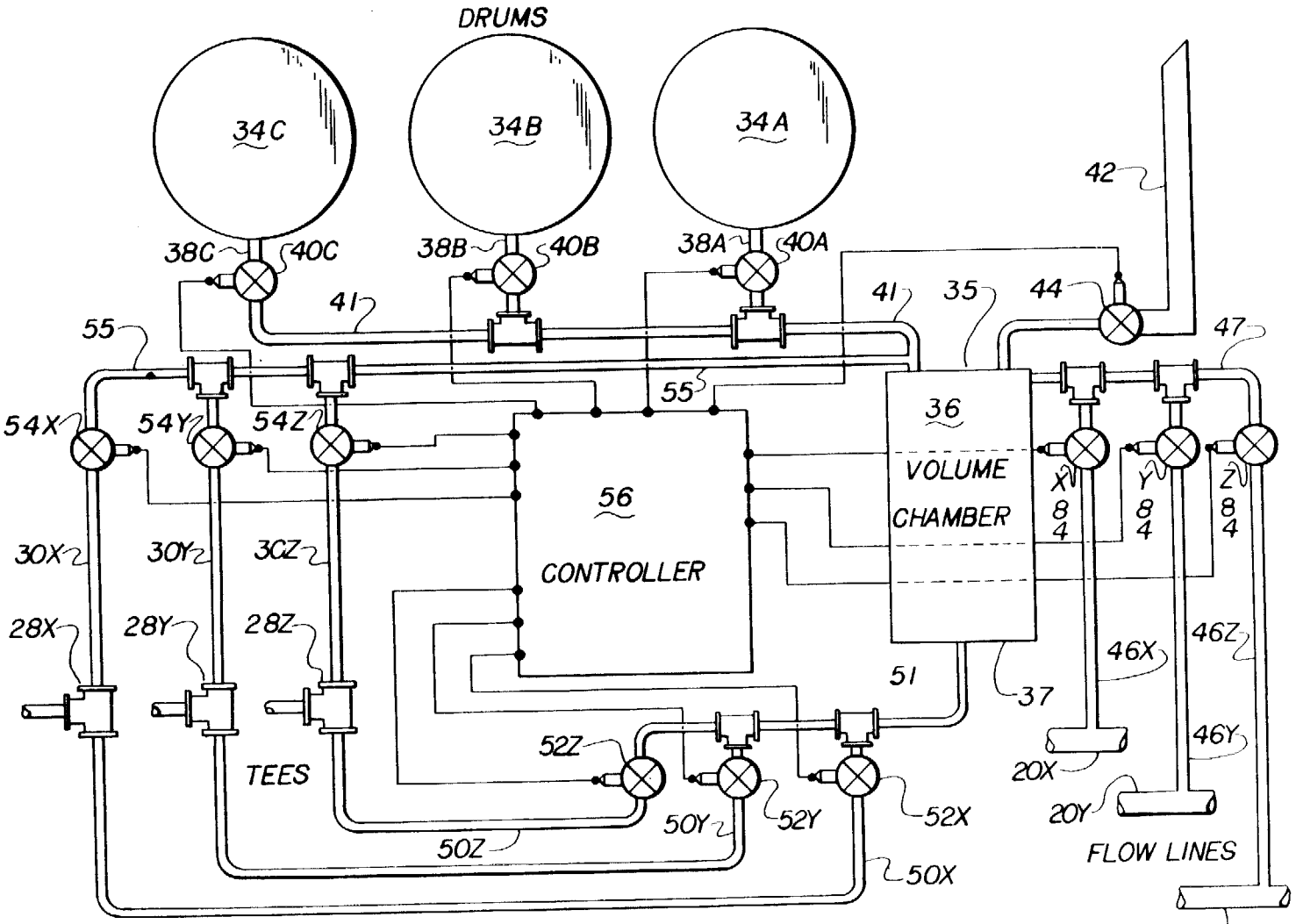
FIG. 2 is a schematic representation of a second embodiment of a system to add chemicals from one, two, or three drums into each of three different oil wells.

One treatment unit to be used for a plurality of wells, each requiring a plurality of different treatment liquids, is illustrated in FIG. 2. Basically, each of the wells would have a reservoir pump, pump jack, pump intake, eduction tube, flow line, casing, annulus, monitoring unit, and separating tee, (with gas line, and fluid line) all as described above.

The treatment unit would have a plurality of treatment drums, three of which have been illustrated for convenience (although it would be understood that there could be more). The drums are indicated as treatment drums 34A, 34B and 34C. The single volume chamber 36 has top 35 and bottom 37 as before. Each of the treatment drums would have a feed line. I.e. feed line 38A would extend from treatment drum 34A; 38B from treatment drum 34B, etc. These feed lines would each have a feed valve, 40A in feed line 38A etc. The feed valves would all be connected by feed manifold 41 to the top 35 of volume chamber 36. There would be only the one vent line 42 with one vent valve 44.

The unit is connected to a plurality of wells, three of which is used for the purpose of illustration only. The wells are designated as wells X, Y, and Z. Pressure manifold 47 is connected to the volume chamber 36. Pressure line 46X is connected to the flow line 20X of well X. Pressure line 46Y connects to the flow line 20Y of the well Y, and pressure line 46Z connects to the flow line 20Z of the well Z. Likewise a flush manifold 51 is connected to the bottom 37 of the volume chamber and flush line 50X extends to the fluid line from the separating tee of well X. Flush line 50Y extends to the fluid line of well Y, etc. Each of the pressure lines 46A, B, and C has valve 48X, Y, and Z. Each of the flush lines 50X, Y and Z has flush valve 52X, Y and Z therein. Gas manifold 55 is connected to the top 35 of the volume chamber 36. Gas line 30X, Y and Z extend to each of the wells to the top of the separating tee. Each of the gas lines has gas valve 54X, Y and Z therein.

The controller 56 to treat well X would first open the treatment valves 40A, B or C as necessary to provide the proper treatment liquids for well X. The operator would decide the proper treatment for well X. Should the proper treatment be a mixture of liquid from treatment drums 34A and 34B but none from 34C, the unit would be set to open valves 40A and B only. Of course the vent valve 44 would be open. Then after the volume chamber is filled with the proper chemical for the treatment of well X, the pressure valve 48X from flow line 20X would be open and the flush valve 52X leading to tee 28X would be open. Thus the volume chamber would be flushed into well X. After this was completed, the gas valve 54X and flush valve 52X would be open to purge the volume chamber.

Then to treat well Y (either on demand or on time) the proper treatment valves 38A, B or C would be open along with vent valve 44 to fill the volume chamber 36 with the proper treatment for well Y. After the volume chamber is properly filled, then the treatment chemical would be flushed by opening pressure valve 48Y from flow line 20Y and the flush valve 52Y. After the chemical is flushed into well Y, then the volume chamber would be purged by the opening of the gas valve 54Y along with the flush valve 52Y.

In the like manner, it may be seen that each of the wells in turn could be treated either on a time basis or on a "demand" basis.

Modern electronics have advanced so that controllers, as shown in controller 56, can be designed to perform the multiple functions of controlling the several wells with different chemicals in a simple, expedient manner.

Thus it may be seen that I have provided a treatment system for treating either a single well with a single chemical, or treating a plurality of wells with a plurality of different chemicals.

Specifically, modern electronics make it a matter within ordinary skill of those in the computer arts to provide many additional features to the controller 56. For example, one feature which is very desirable on such a system as this is to provide a memory within the controller 56 so that the controller remembers the sequence of events which has been performed and when they were performed. Therefore, by having a simple connection on the exterior of the controller, an operator may plug in a simple recording device, and take the information from the memory of the controller 56. In this way a permanent record may be maintained as to the operation of the treatment unit.

Also, it is necessary on the operation of my device that there be a pressure in the flow line for proper operation. Those skilled in the oil well arts will understand that the pump 12 operates only intermittently and therefore there would be pressure on the flow line 20 only when the pump 12 was operating. From the above description, it will be understood that if the pump 12 stopped operating during the middle of the processing cycle, that of the treatment cycle would not properly function due to the lack of pressure in the flow line. I have found that it is desirable to program the controller so that a treatment cycle begins within a few minutes after the pump 12 begins operating. This is a simple matter by obtaining pressure information from the flow line through the monitoring unit. Therefore, the controller begins a treatment of cycle not at the exact time it receives the activation signal (which would be either upon demand of the monitoring unit, or upon the time signal created internally) but at the beginning of the next pumping cycle after the activation signal is received. I.e. two conditions must exist before the treatment cycle begins: (1) the need for treatment and (2) the beginning of a pumping cycle.

Many additional functions may be performed. For example, sometimes before treating an oil well, it is desirable that the inside surfaces of the casing 22 be wet with the produced well fluids before the treatment cycle begins. Therefore, before the volume chamber 36 is filled with treatment liquid, it is a simple matter to program the controller to open the pressure valve 48 and the flush valve 52 to permit well fluids to circulate into the casing so that the treatment liquid is not primarily used to wet the sides of the casing but flows on into the reservoir 10. Of course after the sides of the casing are wet, then it is necessary to drain or purge the volume chamber 36 by the valve sequence described above, i.e. opening the gas valve 54 and the flush valve 52.

Also, in the event that an increased volume of treatment fluid is to be used rather than the specific volume of the volume chamber 36, it is possible that the steps for filling the volume chamber 36 could be repeated before a complete flushing was achieved. I.e. the operation than would be to first fill the volume chamber 36 from the treatment drum 34, flush the volume chamber into the annulus, purge the volume chamber, then again refill the volume chamber with treatment fluid, again flush the volume chamber into the annulus, and again purge the volume chamber, again refill the volume chamber, flush the volume chamber. If the desired volume equaled three times the volume chamber were to be used, then at that point there would be an additional flushing. I.e. the pressure valve 48 and the flush valve 52 would remain open for a period of time to completely flush the treatment fluid down into the reservoir 10. This complete flushing step is sometimes called a recirculating step, i.e. the treatment fluid is recirculated from the reservoir through the pump and flow line back into the annulus for a more complete mixing or circulation of the treatment fluid. Therefore, it is possible to give multi-shots of treatment fluid before there is a complete flushing.

My statement that those having ordinary skill in the computer arts would understand how to program the controller 56 to achieve these results does not in any way indicate that I believe that the concept or the advantages of the functions, such as the multi-shot treatment, would be obvious to one in the art.

The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawings of the specific examples above do not point out what an infringement of this patent would be, but are to enable the reader to make and use the invention.

As an aid to correlating the terms of the claims to the exemplary drawing, the following catalog of elements is provided:

| | |
|---|---|
| 10 reservoir | 37 bottom |
| 12 pump | 38 feed line |
| 14 pump jack | 40 feed valve |
| 16 pump intake | 41 feed manifold |
| 18 eduction tube | 42 vent line |
| 20 flow line | 44 vent valve |
| 22 casing | 46 pressure line |
| 24 annulus | 47 pressure manifold |
| 26 monitoring unit | 48 pressure valve |
| 28 tee | 50 flush line |
| 30 gas line | 51 flush manifold |
| 32 fluid line | 52 flush valve |
| 34 treatment drum | 54 gas valve |
| 35 top | 55 gas manifold |
| 36 volume chamber | 56 controller |

SUBJECT MATTER CLAIMED FOR PROTECTION

I claim as my invention:

1. In a liquid system having:

a. a liquid reservoir, b. a pump with a pump intake in the reservoir, c. a flow line from the pump having pressurized liquid from the reservoir, d. a treatment drum, and e. treatment liquid in the drum; wherein the improved structure for adding treatment liquid to the reservoir comprises:

f. a closed volume chamber having a top and bottom, g. a flush line extending from the bottom of the volume chamber to the reservoir, h. a flush valve in the flush line, j. a treatment feed line connecting the treatment drum to the volume chamber, k. a feed valve in the feed line, l. a vent line extending from the top of volume chamber to atmosphere, m. a vent valve in the vent line, n. a liquid pressure line from the flow line to the volume chamber, and o. a pressure valve in the pressure line, p. a source of gas at a gas pressure which is greater than the pressure of the reservoir liquid at the level of the bottom of the volume chamber, q. a gas line connecting the source of gas to the volume chamber, and r. a gas valve in the gas line, s. a controller providing means for opening and closing said valves so that (i) opening the fixed valve and the vent valve and closing all other valves will fill the volume chamber with treatment liquid, and then (ii) opening the flush valve and pressure valve and closing all other valves will flush the treatment liquid from the volume chamber into the reservoir, and (iii) after flushing the treatment liquid into the reservoir, then opening the gas valve and flush valve and closing all other valves will purge the volume chamber of liquid.

2. The invention as defined in claim 1 having limitations a. through t. further comprising:

u. said liquid reservoir and said pump far beneath the surface of the earth, v. a casing extending from the surface of the earth to the reservoir, w. an eduction tube extending from the pump to the surface of the earth with said flow line on said eduction tube, x. said controller being means for performing the following functions:

(i) opening the pressure valve and flush valve to pre-wet the casing with the liquid in the flow line then, (ii) closing the pressure valve, then (iii) opening the gas valve to purge the volume chamber, then (iv) closing the gas valve and flush valve, then (v) opening the feed valve and the vent valve to fill the volume chamber with the treatment liquid, then (vi) closing the feed valve and vent valve, then (vii) opening the flush valve and pressure valve to flush the treatment liquid from the volume chamber into the reservoir, then (viii) repeating the steps (ii) through (vii) at least once, thereafter (ix) closing the pressure valve and opening the gas valve so that all liquid within the volume chamber will drain through the flush valve.

3. The invention as defined in claim 2 having limitations a. through x. further comprising:

y. a second treatment drum, z. a second treatment feed line connecting the second treatment drum to the volume chamber, aa. a second feed valve in the second feed line, and bb. said controller also being means for:

(i) after pre-wetting the casings as defined in limitation x(i) above, closing the pressure valve, then (ii) opening the gas valve to purge the volume chamber, then (iii) closing the gas valve and flush valve, then (iv) opening the second feed valve and the vent valve to fill the volume chamber with the second treatment liquid, then (v) closing the second feed valve and vent valve, then (vi) opening the flush valve and pressure valve to flush the second treatment liquid from the volume chamber into the reservoir.

*4. In a liquid system having:*

*a. a liquid reservoir,*

*b. a pump with a pump intake in the reservoir,*

*c. a flow line from the pump having pressurized liquid from the reservoir,*

*d. a treatment drum, and*

*e. treatment liquid in the drum; wherein the improved structure for adding treatment liquid to the reservoir comprises:*

*f. a closed volume chamber having a top and bottom,*

*g. a flush line extending from the bottom of the volume chamber to the reservoir,*

*h. a flush valve in the flush line,*

*j. a treatment feed line connecting the treatment drum to the volume chamber,*

*k. a feed valve in the feed line,*

*l. a vent line extending from the top of volume chamber to atmosphere,*

*m. a vent valve in the vent line,*

*n. a liquid pressure line from the flow line to the volume chamber, and*

*o. a pressure valve in the pressure line,*

*p. a controller providing means for opening and closing said valves so that*

*(i) opening the feed valve and the vent valve and closing all other valves will fill the volume chamber with treatment liquid, and then*

*(ii) opening the flush valve and pressure valve and closing all other valves will flush the treatment liquid from the volume chamber into the reservoir, and*

*(iii) after flushing the treatment liquid into the reservoir, then opening the vent valve and leaving the flush valve open and closing all other valves will purge the volume chamber of liquid.*

* * * * *